United States Patent [19]
Seely et al.

[11] Patent Number: 5,821,192
[45] Date of Patent: Oct. 13, 1998

[54] METHOD OF IMPROVING THE ATTRITION RESISTANCE OF V/SB OXIDE BASED CATALYST

[75] Inventors: Michael J. Seely, Twinsburg; Maria Strada Friedrich, Lyndhurst; Dev Dhanaraj Suresh, Hudson; Frank John Kocjancic, Independence, all of Ohio

[73] Assignee: The Standard Oil Company, Cleveland, Ohio

[21] Appl. No.: 717,074

[22] Filed: Sep. 23, 1996

Related U.S. Application Data

[63] Continuation-in-part of Ser. No. 574,055, Dec. 18, 1996, abandoned.

[51] Int. Cl.⁶ .............................. B01J 23/18; B01J 23/22
[52] U.S. Cl. ........................................ 502/353; 502/354
[58] Field of Search ...................................... 502/353, 354

[56] References Cited

U.S. PATENT DOCUMENTS 3,686,138  8/1972  Yoshino et al. ........................ 252/456

*Primary Examiner*—Michael L. Lewis
*Assistant Examiner*—Alexander G. Ghyka
*Attorney, Agent, or Firm*—Michael F. Esposito; David J. Untener

[57] ABSTRACT

A process for preparing a catalyst having the following formula:

$$V_a Sb_b M_c O_x$$

wherein M=tin, titanium, lithium, sodium, potassium, molybdenum, tungsten, iron, chromium, cobalt, copper, gallium, niobium, tantalum, tellurium, bismuth, or mixtures thereof, a=0.1 to 5, preferably 0.1 to 3, most preferably 0.1 to 2 b=0.1 to 5, preferably 0.1 to 3, most preferably 0.1 to 2 c=0.0 to 5, preferably greater than 0 to 5, most preferably 0.01 to 3, and x is a number sufficient to satisfy the valency requirements of the elements, comprising forming an aqueous slurry comprising vanadium and antimony, adding a peptizing agent free of any lithium compounds capable of providing hydroxide ions to said slurry and spray drying said slurry to form an attrition resistant catalyst.

5 Claims, No Drawings

METHOD OF IMPROVING THE ATTRITION RESISTANCE OF V/SB OXIDE BASED CATALYST

This application is a continuation in part (CIP) application of application Ser. No. 08/574,055 filed Dec. 18, 1996, now abandoned.

BACKGROUND OF THE INVENTION

Field of the Invention

The present invention is directed to a novel method of improving the attrition resistance of vanadium/antimony based oxide catalyst useful in the ammoxidation of hydrocarbons, in particular propylene or propane to acrylonitrile. U.S. Pat. Nos. 5,258,543 and 5,008,427, both assigned to the assignee of the instant application, disclose the ammoxidation of olefins and paraffins, respectively, to acrylonitrile. Each of these patents discloses the use of a vanadium/antimony based catalyst for the ammoxidation reaction. While the catalyst disclosed in each of these patents shows significant commercial potential for the ammoxidation of propylene or propane to acrylonitrile, each may be improved upon. In particular, each of these catalysts can have the hardness of the catalyst improved so that improved attrition resistance can be obtained, thereby improving the economics when using the catalyst in the operation of a fluid bed reactor. In U.S. Pat. No. 5,432,114, assigned to the assignee of the present application, a procedure is disclosed for preparation of attrition resistant $VSbO_x$ catalyst. The present invention is directed to a method of improving the attrition resistance of these types of catalysts.

SUMMARY OF THE INVENTION

It is the primary object of the present invention to improve the attrition resistance of vanadium/antimony based oxide catalyst useful in the ammoxidation of olefins or paraffins to the corresponding nitriles. In particular, the ammoxidation of propylene or propane to acrylonitrile.

Other objects, as well as aspects, features and advantages of the present invention will become apparent from the study of the accompanying disclosure and the claims. According to one aspect of the invention, there is provided a process for making an improved attrition resistant vanadium/antimony oxide based catalyst characterized by the formula:

$$V_aSb_bM_cO_x$$

wherein M=tin, titanium, lithium, sodium, potassium, molybdenum, tungsten, iron, chromium, cobalt, copper, gallium, niobium, tantalum, tellurium, bismuth, or mixtures thereof, a=0.1 to 5 b=0.1 to 5 c=0.0 to 5, and x is a number sufficient to satisfy the valency requirements of the elements, comprising forming an aqueous slurry comprising vanadium and antimony, adding a peptizing agent essentially free of any lithium containing compounds capable of providing hydroxide ions to the catalyst slurry to said slurry and selected from the group consisting of ammonia, ammonium hydroxide, alkyl amine, aryl amines substituted ammonium hydroxide and heterocyclic amines and spray drying said slurry to form an attrition resistant catalyst.

In a preferred embodiment of the present invention, a metal salt of the M element is added to the slurry prior to drying. Typical metal salts which may be utilized in the practice of the present invention include salts soluble in water such as metal nitrates, metal acetates, etc.

In a further preferred embodiment of the present invention, the peptizing agent comprises ammonia, ammonium hydroxide, alkyl and aryl amines (e.g. methylamine, butylamine, aniline), substituted ammonium hydroxides (e.g. tetra methyl ammonium hydroxide, and heterocyclic amines such as pyridine or morpholine). The preferred peptizing agent is n-butylamine. The preferred amount of peptizing agent added to the slurry ranges from 0.05 to 5% by weight of the catalyst, most preferably 0.1 to 3% by weight of the catalyst, especially preferred being 0.1 to 2 wt % of the catalyst.

In a still further preferred embodiment, the slurry is spray dried in a spray dryer wherein the inlet temperature is typically between 300° C. to 350° C., preferably 310° C. to 340° C., and the outlet temperature is between about 100° C. to 150° C., preferably 110° C. to 140° C., to form microspheroidal particles having a size ranging from 20 to 250μ, preferably 40 to 100μ.

In another preferred embodiment of the present invention, the catalyst can be used in either unsupported or supported form. Preferably, the support for the catalyst is selected from silicon oxide, aluminum oxide, zirconium oxide, titanium oxide and/or mixtures. The level of the support can be from greater than 0 to 60%. Preferably, the level of the support is between 30 to 50%.

In still another preferred embodiment of the present invention, the dried catalyst is calcined at a temperature above 650° C., preferably between 650° C. to 1100° C., most preferably 675° C. to 1000° C.

DETAILED DESCRIPTION OF THE INVENTION

The present invention is directed to a process for improving the attrition resistance of vanadium oxide based catalyst systems. In particular, the present invention is directed to improving the attrition resistance of vanadium/antimony oxide based catalyst, which have been promoted with various metals.

The process of preparing a vanadium oxide catalyst of the present invention is characterized by the general formula set forth below:

$$V_aSb_bM_cO_x$$

wherein M=tin, titanium, lithium, sodium, potassium, molybdenum, tungsten, iron, chromium, cobalt, copper, gallium, niobium, tantalum, tellurium, bismuth, or mixtures thereof, a=0.1 to 5, preferably 0.1 to 3, most preferably 0.1 to 2 b=0.1 to 5, preferably 0.1 to 3, most preferably 0.1 to 2 c=0.0 to 5, preferably greater than 0 to 5, most preferably 0.01 to 3, and x is a number sufficient to satisfy the valency requirements of the elements, comprises forming an aqueous slurry comprising vanadium and antimony, adding a peptizing agent essentially free of any lithium compound capable of providing hydroxide ions to said slurry and selected from the group consisting of ammonia, ammonium hydroxide, alkyl amine, aryl amines substituted ammonium hydroxide and heterocyclic amines and drying said slurry to form the catalyst particles.

As stated previously, the catalyst of the present invention can be prepared by the methods disclosed in U.S. Pat. Nos. 5,258,543 and 5,008,427, herein incorporated by reference. Typically, the process comprises mixing a vanadium pentoxide powder in water and vigorously stirring in a 30% hydrogen peroxide solution which slowly began to dissolve the vanadium pentoxide. After this vigorous stirring, an addition of the antimony oxide to the slurry was made with continuous stirring. If desired, the promoter elements M may be introduced into the slurry after the vanadium and antimony have been mixed. Typically, titanium is introduced as titanium oxide; cobalt, zinc and calcium as a nitrate salt; lithium as lithium nitrate; magnesium as magnesium nitrate; tin as a tin oxide sol; gallium as a gallium nitrate salt; chromium in the form of chromium oxide and water; copper as a copper nitrate salt; iron as an iron nitrate salt and molybdenum in the form of ammonium heptamolybdate. After the slurry has been formed, it is heated for approximately 3 to 4 hours at which point, if desired, the promoter element can be added as discussed above. The slurry is then evaporated with constant stirring until it is thickened and dried at 120° C. over night and calcined at above 650° C.

The process of the present invention involves the addition of a peptizing agent to the slurry prior to evaporation to dryness and calcining. It is found that the addition of the peptizing agent, in particular, n-butylamine, to the slurry during the preparation of catalyst increases the hardness of the catalyst, thereby improving the attrition resistance of the catalyst when utilized in the fluid bed reactor.

The Sn sol used in each of the following examples was prepared by the following general procedure: 25.0 g Tin metal (Alfa −100 mesh) (2.106×10-1M) was added slowly in portions to a stirred mixture of 75 ml conc. $HNO_3$ and 150 ml distilled $H_2O$. Addition was made over ~30 minutes keeping the temperature <60° C. (typically 50°–55° C.). The off-white mixture was stirred another 1 hour and then divided into two 110 ml portions in "V" shaped graduated cylinders and allowed to settle overnight. An ~80 ml suspension and 30 ml clear supernatant was obtained in each cylinder. The supernatant was pipetted off and discarded. The remaining suspension was divided into equal ~45 ml portions in centrifuge tubes and spun at 3500 rpm for 30 minutes in a centrifuge. This was very effective yielding 17.5 ml dense ppt. and 27.5 ml of clear supernatant in each tube. The supernatant liquid was clear and poured off conveniently from the ppt. The combined solids were diluted to ~180 ml with distilled $H_2O$ and re-dispersed with stirring. The pH was ~1 at this point. The suspension was neutralized by adding 20 ml con $NH_4OH$ solution to give pH 8 (and then 10 drops con $HNO_3$ were added to bring suspension back to pH 7). The slurry thickened and dispersed well as the neutralization took place. The fine white suspension was again centrifuged 30 minutes in four tubes to give 15 ml ppt and 35 ml clear supernatant in each tube. The combined ppt's were placed in a Buchner funnel and washed with $H_2O$. The resulting filter cake was placed in a 600 ml beaker and 7.7 g (1.053×10-1M or 0.5M amine per mole Sn) n-butylamine was added. The mixture was triturated with a spatula to give a uniform paste and was then heated on a thermostated hotplate at 100° C. for 1 hour. Finally, the grey gel was dispersed with 190 ml distilled water and then filtered, obtaining 270 g of a grey-white translucent sol.

EXAMPLE 1

The $SnO_2$ sol used was prepared by the general procedure described above using 17.71 g. $SnO_2$ sol paste was mixed with 0.97 g n-butylamine to give a grey suspension. 21 g of $H_2O$ was added to give a light yellow sol which had a pH of about 11.0. The sol was centrifuged for 1 minute at 3500 rpm to separate unreacted Sn metal to obtain a light yellow clear sol. A 2 ml portion of this sol was titrated with 39.10 ml of 0.02M HCl. The sol contained 2.44% amine by weight.

This sol was then used to prepare a catalyst having the formula $V_1Sb_{1.5}Sn_{0.2}O_{5.15}$ as follows:

45 g of $H_2O_2$ was added to 405 cc of distilled $H_2O$. 12.11 g of $V_2O_5$ were then added with stirring until a dark red solution formed. 28.96 g of $Sb_2O_3$ was added and digested for about 3 hours while the mixture turned black and thick. 19.96 g of the $SnO_2$ sol was then added and the catalyst slurry was evaporated on a hot plate, then dried at 120° C., and calcined at 650° C. for 8 hours and at 810° C. for 3 hours.

EXAMPLE 2

The procedure of Example 1 above was followed except that the $SnO_2$ sol contained 0.76 wt % amine (18.42 g of paste mixed with 0.3 g n-butylamine).

EXAMPLE 3

The procedure of Example 1 was followed except that the $SnO_2$ sol contained 0.38% by weight n-butylamine (17.78 g of paste with 0.15 g n-butylamine).

EXAMPLE 4 (Comparative)

The procedure of Example 1 was followed except the $SnO_2$ sol did not contain any stabilizer.

The data set forth in Table I below illustrate the results of the present invention compared to Example 4 which did not contain the stabilizer. As can be readily seen, the hardness of the catalyst increases upon the addition of the stabilizer (peptizing agent) to the catalyst.

While the invention has been described in conjunction with the specific embodiments thereof, it is evident that many alternatives, modifications and variations will be apparent to those skilled in the art in light of the foregoing description. Accordingly, it is intended to embrace all such alternatives and modifications and variations as fall within the spirit and broad scope of the appended claims.

TABLE I

| Example | Cat. # | Sn Sol | Stabiliz wt % in Sol. (wt. % in Cat.) | Hardness (% 20–35) | S.A. ($m^2/g$) | Density (g/cc) | % Conv. | % AN Sel. | Feed |
|---|---|---|---|---|---|---|---|---|---|
| 1 | $VSb_{1.5}Sn_{0.2}O_{5.15}$ | 15602-39-1C | 2.44 (1.08) | 43.0 | 3.8 | 2.49 | 17.1 | 42.9 | High $O_2/NH_3$ |
| 2 | $VSb_{1.5}Sn_{0.2}O_{5.15}$ | -39-2C | 0.76 (0.34) | 41.5 | 3.4 | 1.94 | 17.8 | 54.2 | High $O_2/NH_3$ |

TABLE I-continued

| Example | Cat. # | Sn Sol | Stabiliz wt % in Sol. (wt. % in Cat.) | Hardness (% 20–35) | S.A. (m$^2$/g) | Density (g/cc) | % Conv. | % AN Sel. | Feed |
|---|---|---|---|---|---|---|---|---|---|
| 3 | VSb$_{1.5}$Sn$_{0.2}$O$_{5.15}$ | -39-3C | 0.38 (0.17) | 41.1 | 2.8 | 1.68 | 16.2 | 58.0 | High O$_2$/NH$_3$ |
| 4 (Comparative) | VSb$_{1.5}$Sn$_{0.2}$O$_{5.15}$ | -39-4C | 0.00 | 36.7 | 2.3 | 1.43 | 12.7 | 60.4 | High O$_2$/NH$_3$ |

What is claimed is:

1. A process for making an improved attrition resistant vanadium/antimony oxide based catalyst characterized by the formula:

$$V_aSB_bM_cO_x$$

wherein M=tin, titanium, lithium, sodium, potassium, molybdenum, tungsten, iron, chromium, cobalt, copper, gallium, niobium, tantalum, tellurium, bismuth, or mixtures thereof,
 a=0.1 to 5
 b=0.1 to 5
 c=greater than zero to 5, and
 x is a number sufficient to satisfy the valency requirements of the elements,
comprising forming an aqueous slurry comprising vanadium and antimony, and M and spray drying said slurry to form an attrition resistant catalyst wherein a peptizing agent selected from the group consisting of ammonia, ammonium hydroxide, alkyl amine, aryl amines substituted ammonium hydroxide and heterocyclic amines is incorporated with the M element prior to addition of M to said aqueous slurry.

2. The process of claim 1 wherein the peptizing agent is selected from the group consisting of methylamine, butylamine, aniline pyridine, morpholine and tetramethyl ammonium hydroxide.

3. The process of claim 1 wherein the peptizing agent is selected to be n-butylamine.

4. The process of claim 3 wherein the peptizing agent is added to the slurry in an amount ranging from 0.05 to 5% by weight of the catalyst.

5. The process of claim 1 wherein the spray dried particles are calcined at a temperature above 650° C.

* * * * *